G. W. KEEN.
Nut-Locks.
No. 137,453.
Patented April 1, 1873.
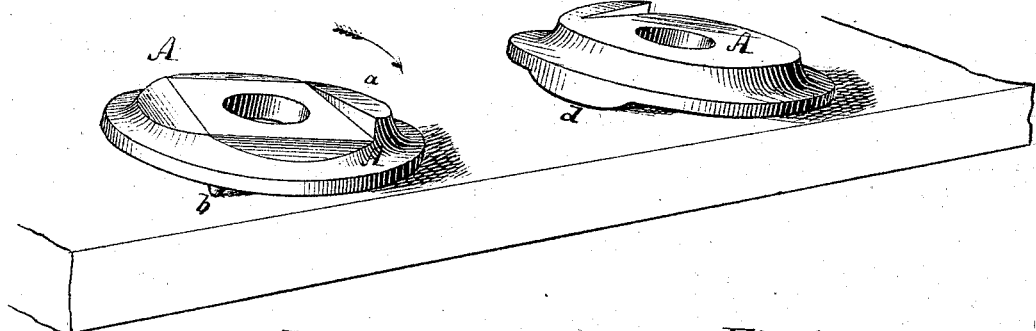
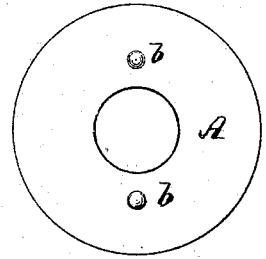
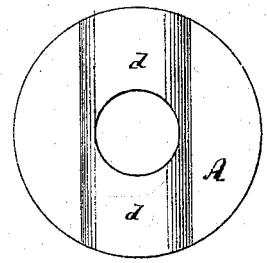
Witnesses.
John Becker.
Fred Haynes
George W. Keen
per Wales, Brown & Allen
Attorneys

UNITED STATES PATENT OFFICE.

GEORGE W. KEEN, OF ZANESVILLE, OHIO.

IMPROVEMENT IN NUT-LOCKS.

Specification forming part of Letters Patent No. 137,453, dated April 1, 1873; application filed February 27, 1873.

*To all whom it may concern:*

Be it known that I, GEORGE W. KEEN, of Zanesville, in the county of Muskingum and State of Ohio, have invented an Improved Nut-Lock Washer, of which the following is a specification:

Figures 1 and 2 are perspective views, showing modifications of my improved nut-lock washer; and Figs. 3 and 4 are reverse or back views of the same, respectively.

Similar letters of reference indicate corresponding parts in all the figures.

The object of this invention is to produce a very simple and effective means for preventing the nuts on railroad cars, fish-plates, and other devices which are exposed to jarring motion, from turning loose in their bolts, and still to permit a ready and convenient application of the nuts to their bolts.

My invention consists in constructing a washer of cast metal with an inclined projection on its face, and with a projection or projections on its back, which latter-named projections will allow it to rock in such manner that, while the nut is being applied to the bolt, the washer will rock to let the nut pass over the inclined face projection, while, when the nut has been applied, the inclined projection will keep it in place and prevent it from turning loose.

This construction of washer with a rocking bottom is exceedingly simple and inexpensive, and, at the same time, thoroughly effective. Its simplicity, as compared with lock-nuts now in use, will make it a desirable acquisition to all constructors of railway machinery, railroads, &c., more particularly, also, because the rocking feature will permit the straight application of a nut to its bolt, not furnishing any obstacle by which the nut might be twisted on the screw.

In the accompanying drawing, the letter A represents my improved washer for locknuts. This washer is made of the requisite size, either polygonal or circular, or of irregular outline, and of cast-iron or other suitable material, and has on its outer face a projecting wedge or V-shaped incline, $a$, while on its reverse or back it has projecting pins $b$, or a rounded projection, $d$, as in Figs. 2 and 4, or equivalent provision for allowing that edge of the washer near which the incline $a$ is placed to rock against and away from the plate against which such washer is applied. The washer is perforated in the center to fit around the bolt, the perforation being so much larger than the bolt as to prevent the desired rocking motion. The nut to be applied to the bolt is fitted against the outer face of the washer, and when turned in the direction of the arrows shown in Figs. 1 and 2, it passes over the incline $a$, the washer rocking against the supporting-plate whenever the nut bears against said incline, thus allowing the nut to be fully applied against the smooth face of the washer. When this has been effected, the washer holds the nut firmly in position and prevents it from turning loose on the bolt. In order to prevent the washer from turning loose with the nut, it may be shaped to bear against the projection on the supporting-plate, or the pins $b\ b$ may enter slight indentations of such supporting-plate, or other equivalent provision may be made.

I am aware that nut-lock washers having inclined face projections similar to the projections $a$ have already been used, and I lay no claim to this feature; but What I do claim, and desire to secure by Letters Patent, is—

The rocking nut-lock washer, made with projections $b$ or $d$ at its back, and with the inclined projection $a$ on its face, substantially as specified.

GEORGE W. KEEN.

Witnesses:
   A. C. ROSS,
   F. COGSWELL.